(12) United States Patent
Flynn

(10) Patent No.: US 7,165,802 B1
(45) Date of Patent: Jan. 23, 2007

(54) FOLDABLE WINDSHIELD ASSEMBLY WITH COMPOUND HINGE

(76) Inventor: Daniel J. Flynn, 8317 Belfry Pl., Port St. Lucie, FL (US) 34986

( * ) Notice: Subject to any disclaimer, the term of this patent is extended or adjusted under 35 U.S.C. 154(b) by 0 days.

(21) Appl. No.: 11/419,605

(22) Filed: May 22, 2006

Related U.S. Application Data

(60) Provisional application No. 60/682,623, filed on May 19, 2005.

(51) Int. Cl.
*B60J 1/06* (2006.01)

(52) U.S. Cl. .......................... 296/88; 296/84.1; 296/87; 296/92

(58) Field of Classification Search ............... 296/84.1, 296/86, 87, 88, 92, 89, 201, 96.2, 96.21
See application file for complete search history.

(56) References Cited

U.S. PATENT DOCUMENTS

| | | | | |
|---|---|---|---|---|
| 988,448 A | * | 4/1911 | Earl | 296/87 |
| 4,773,695 A | * | 9/1988 | Jones et al. | 296/96.21 |
| 5,195,797 A | * | 3/1993 | Hobbs | 296/87 |
| 5,385,380 A | * | 1/1995 | Heavner | 296/84.1 |
| RE35,757 E | * | 3/1998 | Heavner | 296/84.1 |
| 5,791,720 A | * | 8/1998 | Moore et al. | 296/84.1 |
| 5,954,385 A | * | 9/1999 | Moore et al. | 296/84.1 |
| 6,663,158 B1 | * | 12/2003 | Showalter | 296/84.1 |

* cited by examiner

*Primary Examiner*—Jason Morrow
(74) *Attorney, Agent, or Firm*—McGarry Bair PC

(57) ABSTRACT

A foldable windshield assembly includes a windshield support having opposing pairs of upper and lower pillar supports, an upper windshield member connected to the upper pillar supports, and a lower windshield member connected to the lower pillar supports. A hinge is disposed between the opposing pairs of upper and lower pillar supports. The hinge includes a first connector adapted to be rigidly connected to one of the upper or lower pillar supports, a second connector adapted to be slidably connected within the other of the upper or lower pillar supports, and a knuckle having ends pivotally connected to the first connector and the second connector and adapted to be received within one of the upper or lower pillar supports associated with the second connector. The upper windshield member is moveable between use and folded positions by separating the upper pillar from said lower pillar to reveal said knuckle from one of the upper or lower supports and folding the upper windshield member over the lower windshield member.

15 Claims, 8 Drawing Sheets

FOLDABLE WINDSHIELD ASSEMBLY WITH COMPOUND HINGE

CROSS-REFERENCE TO RELATED APPLICATION

This application claims the benefit of U.S. provisional application Ser. No. 60/682,623, filed May 19, 2005, which is incorporated herein in its entirety.

BACKGROUND OF THE INVENTION

1. Field of the Invention

This invention relates to foldable windshield assemblies. More specifically, the invention relates to a compound hinge for a foldable windshield assembly.

2. Description of the Related Art

It is known in the art relating to recreational vehicles such as golf carts, pleasure boats, or the like, to provide windshields to protect passengers from the elements. Such windshield assemblies are frequently of single piece rigid construction and are fixedly bolted to the vehicle frame.

There are times when it is desirable to not have a windshield obstructing a passenger's view, or restricting ventilation through the seating area. Moreover, outside conditions can change while a person is golfing between inclement weather, where it is desirable to use a windshield, to favorable weather, where a windshield may be undesirable. However, most windshield assemblies on recreational vehicles are not conveniently removable in the field, and may require special tooling to do so.

Accordingly, there is a need for a foldable windshield assembly, which can be reconfigured from a full-screen use position to a partial-screen folded position without special tooling. The foldable windshield assembly should have sufficient strength and durability, and should be readily transitioned from its use position to its folded position without the need for retainer clips or other accessories, which can be easily lost or misplaced.

SUMMARY OF THE INVENTION

A foldable windshield assembly comprises a windshield support including opposing pairs of upper and lower pillar supports, an upper windshield member connected to said upper pillar supports, and a lower windshield member connected to said lower pillar supports. A hinge is disposed between said opposing pairs of upper and lower pillar supports. The hinge comprises a first connector adapted to be rigidly connected to one of said upper or lower pillar supports, a second connector adapted to be slidably connected within the other of said upper or lower pillar supports, and a knuckle having ends pivotally connected to said first connector and second connector and adapted to be received within one of said upper or lower pillar supports associated with said second connector. Said upper windshield member is moveable between use and folded positions by separating said upper pillar from said lower pillar to reveal said knuckle from one of said upper or lower supports and folding said upper windshield member over said lower windshield member.

DESCRIPTION OF AN EMBODIMENT OF THE INVENTION

Figure 1:
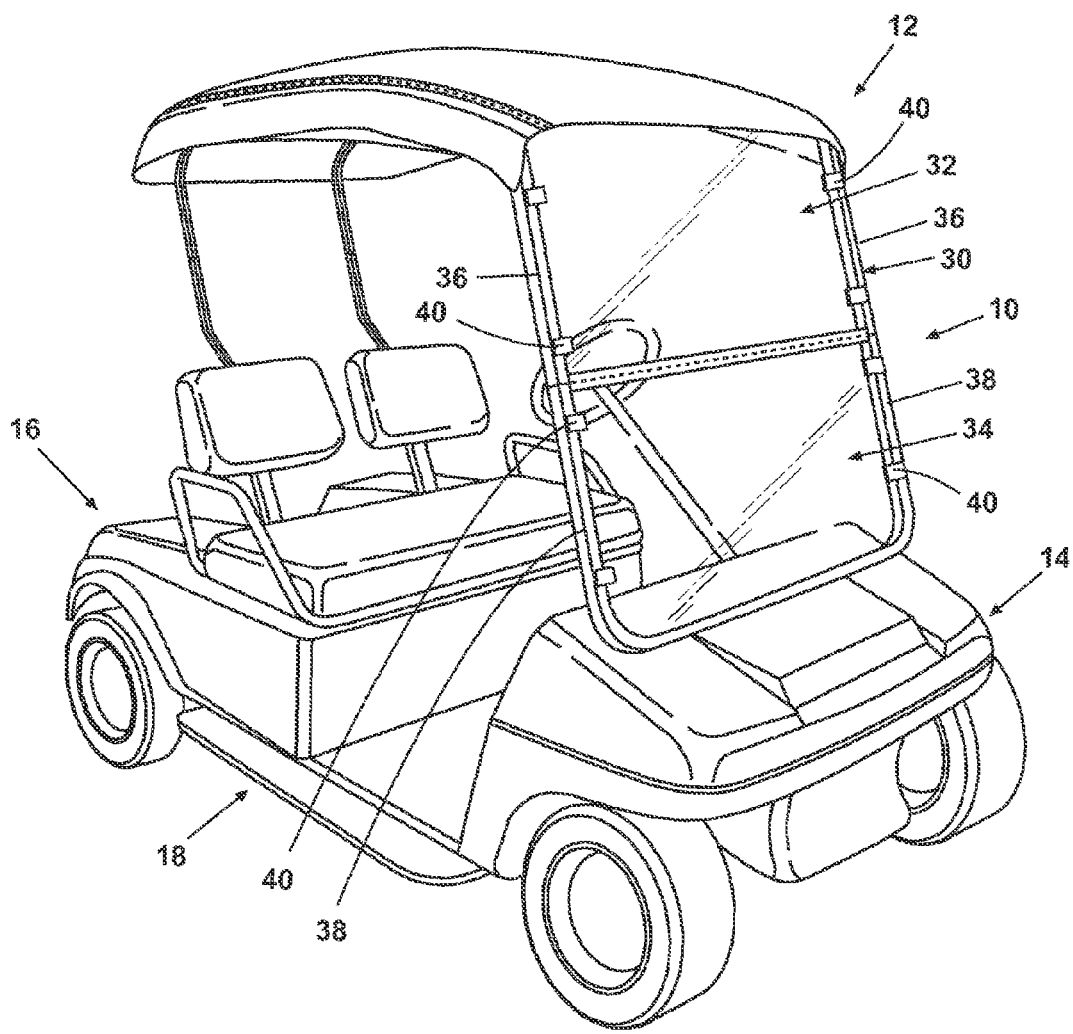
FIG. 1 is a perspective view of a recreational vehicle comprising an embodiment of a foldable windshield assembly with a compound hinge assembly in accordance with the invention.

Referring now to FIG. 1, an exemplary embodiment of a foldable windshield assembly 10 according to the invention is generally shown for a golf cart 12. The golf cart includes a front 14, a rear 16 and a passenger seating area 18 therebetween. The foldable windshield assembly 10 is located forward of the passenger seating area 18 towards the front 14 of the golf cart 12.

Though a golf cart is illustrated in the embodiments herein, one skilled in the art would recognize that the present invention may be used on many other recreational vehicles as well. For example, the windshield assembly may be used on a boat, electric or gasoline driven carts, or the like.

The foldable windshield assembly 10 includes a windshield support 30, an upper windshield member 32 and a lower windshield member 34. The windshield support 30 includes opposing pairs of upper pillar supports 36 and lower pillar supports 38, constructed of rigid tubing. The upper and lower windshield members 32, 34 are attached to upper and lower pillar supports 36, 38 via retainer clips 40.

Figure 2:
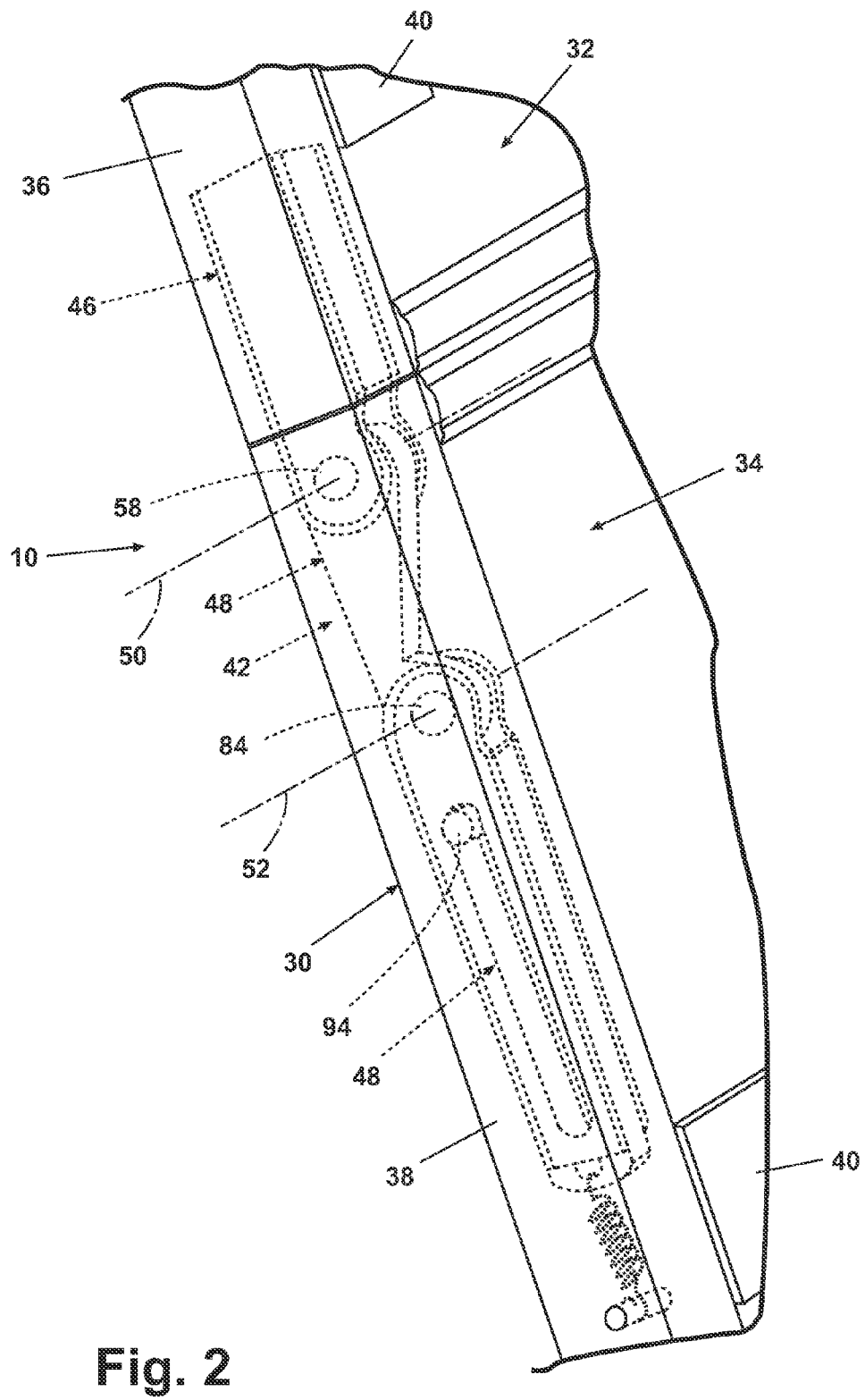
FIG. 2 is an enlarged view of a portion of the foldable windshield assembly and compound hinge assembly illustrated in FIG. 1 showing the windshield assembly in a full-screen use position with the hinge assembly shown in phantom.
Figure 3:
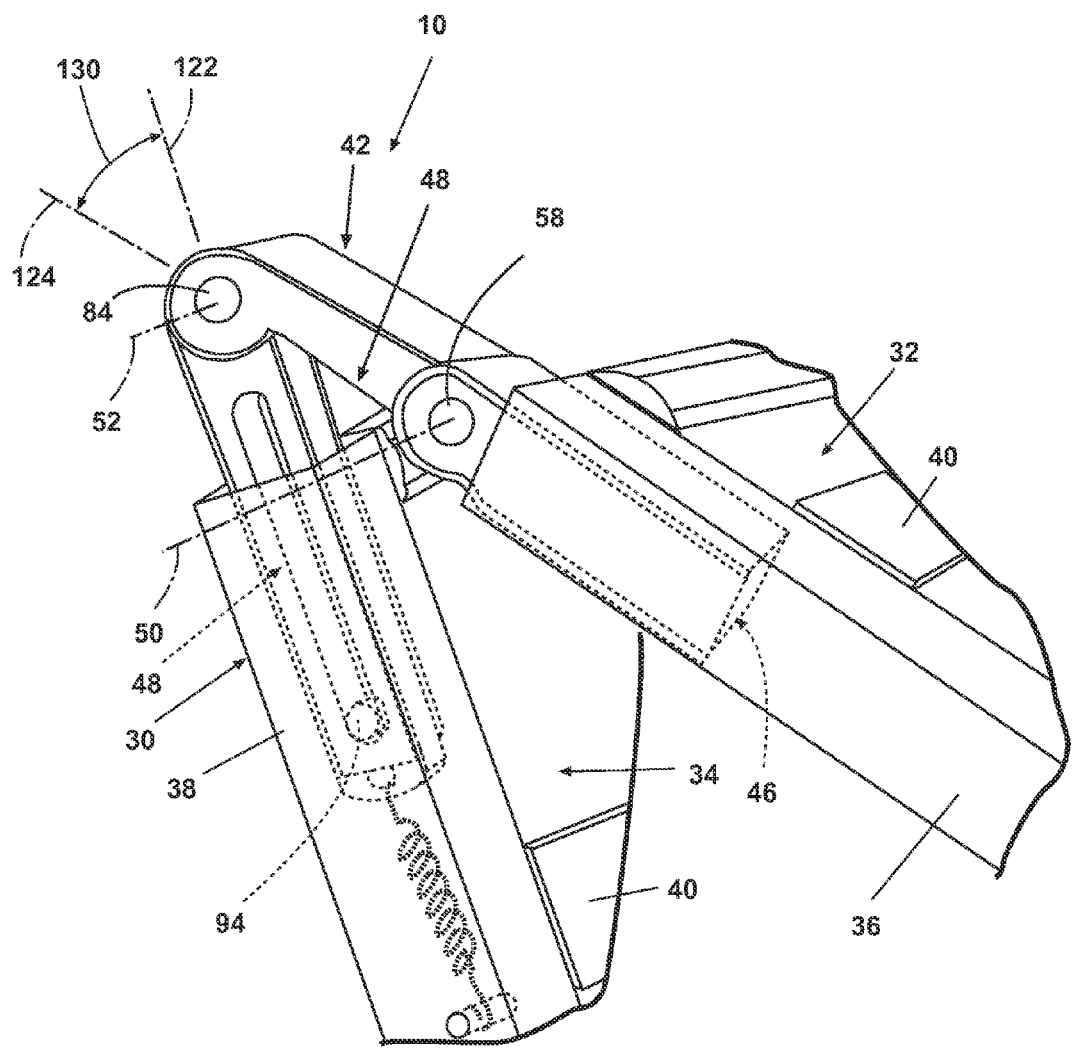
FIG. 3 is an enlarged view of a portion of the foldable windshield assembly and compound hinge assembly illustrated in FIG. 1 showing the windshield assembly in a partial-screen folded position with portions of the hinge assembly shown in phantom.

Referring now to FIGS. 2 and 3, a compound hinge 42 is disposed between each opposing pair of upper and lower pillar supports 36, 38. The hinges 42 allow the upper windshield member 32 and its associated upper pillar supports 36 to be selectively detached from a rigidly erect use position and folded or swung downward to a folded position against the lower windshield member 34 as illustrated in FIG. 3.

Figure 4:
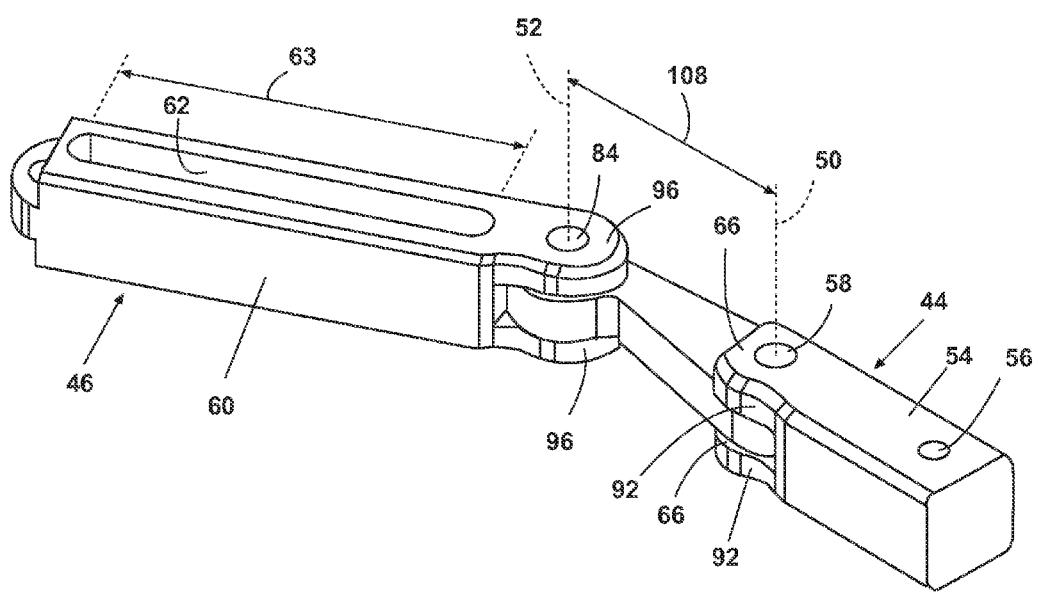
FIG. 4 is a perspective view of the hinge assembly illustrated in FIG. 2.

Referring now to FIG. 4, the compound hinge 42 has a generally complementary cross sectional area, which is sized to fit into the hollow inner portions of the upper and lower pillar supports 36, 38. The hinge 42 includes a first connector 44 and a second connector 46, which that are pivotally connected to an intermediate member 48, referred to hereinafter as a knuckle, for rotation about first 50 and second 52 pivot axes, respectively.

Figure 5A:
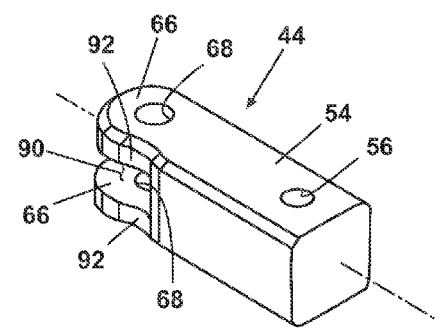
FIGS. 5A–C are perspective, side elevational, and bottom plan views, respectively, of an upper link comprising a portion of the hinge assembly illustrated in FIG. 2.
Figure 5B:
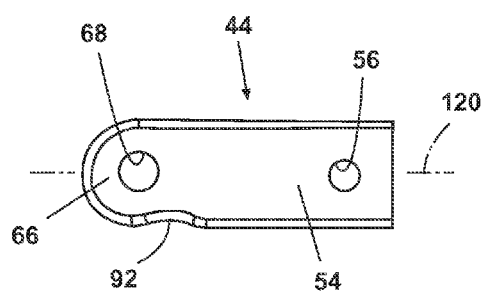
Figure 5C:
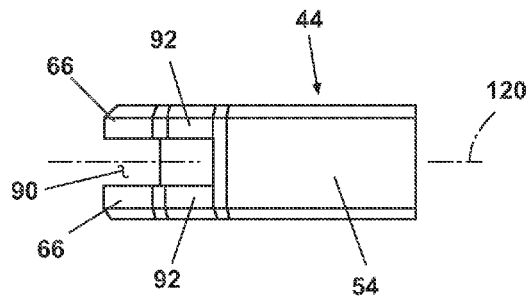

As illustrated in FIGS. 5A–C, the first connector 44 has a main body 54, which slip fits longitudinally into the lower end of the upper pillar supports 36. A mounting hole 56 extends transversely through the body 54 to receive a fastener 58 to rigidly connect the first connector 44 to the upper pillar support 36. The main body 54 terminates in a pair of parallel, spaced plate-like semicircular flanges 66 having a pivot axis hole 68 extending generally concentrically therethrough. The flanges 66 define an insert space 90 therebetween, and are indented along one perimetrical edge 92 where the flanges 66 transition to the main body 54.

Figure 6B:
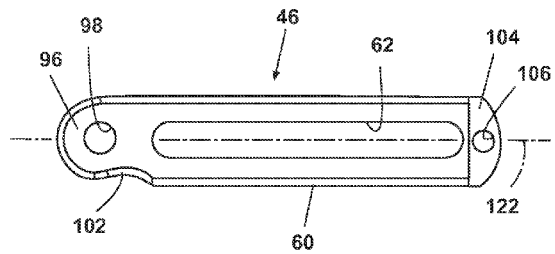
FIGS. 6A–C are perspective, side elevational, and bottom plan views, respectively, of a lower link comprising a portion of the hinge assembly illustrated in FIG. 2.
Figure 6A:
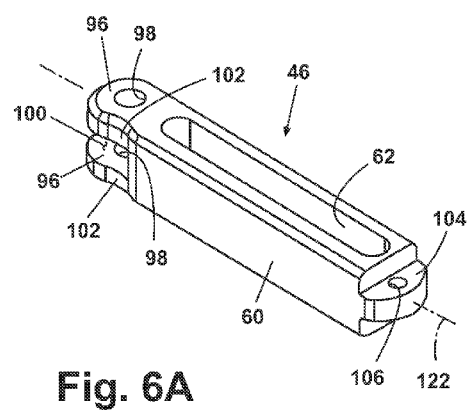
Figure 6C:
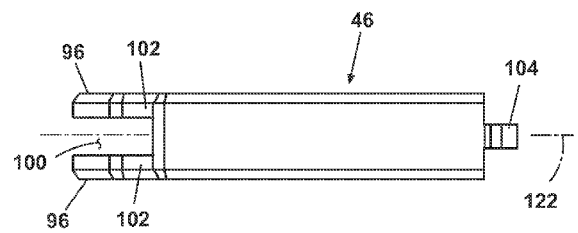

As illustrated in FIGS. 6A–C, the second connector 46 includes a main body 60, which slip fits longitudinally into the upper end of the lower pillar supports 38. A mounting slot 62 having a predetermined mounting slot length 63 is disposed longitudinally in the main body 60 and extends transversely therethrough. The slot 62 has a width, which is sized to slidably receive a slot mounting fastener 94 to slidably attach the second connector 46 to the lower pillar support 38. Though fasteners 58, 64 are illustrated as bolts herein; other connecting fasteners are within the scope of this invention, e.g., screws, rivets or the like.

The main body 60 of the second connector 46 terminates in a pair of parallel, spaced plate-like semicircular flanges 96 having a pivot axis hole 98 extending generally concentrically therethrough. The flanges 96 define an insert space 100 therebetween, and are indented along one perimetrical edge 102 where the flanges 96 transition to the main body 60. Extending from the main body 60 longitudinally opposite the flanges 96 is a generally semicircular plate 104 having an opening 106 extending generally concentrically therethrough.

Figure 7:
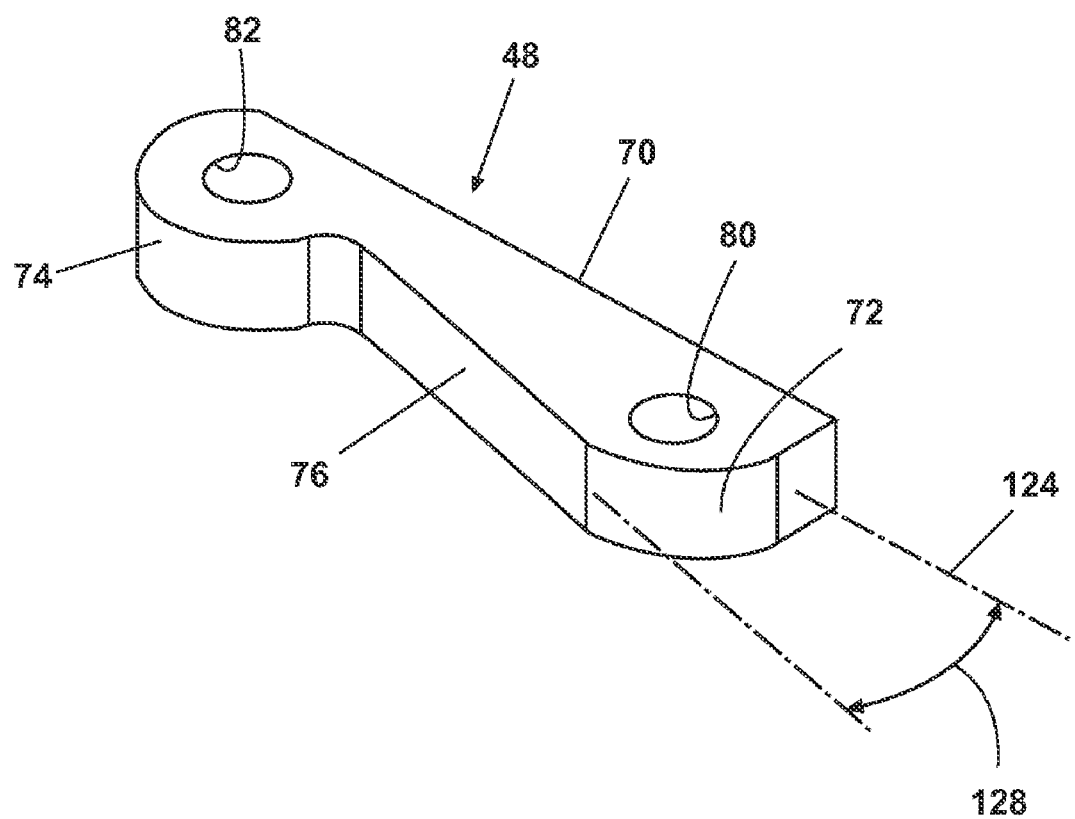
FIG. 7 is a perspective view of a knuckle comprising a portion of the hinge assembly illustrated in FIG. 2.

As illustrated in FIG. 7, the knuckle 48 is an elongated, flattened member having a planar first edge 70, a pair of rounded end portions 72, 74, and a planar, inclined edge 76 joining the two rounded end portions 72, 74. Each end portion 72, 74 includes a knuckle aperture 80, 82, respectively, which is adapted to align with the pivot axis holes 68, 98 of the first and second connectors 44, 46, respectively. A fastener, such as an axis dowel 58, 84, can be press fit through the axis holes 68, 98, respectively, and the knuckle apertures 80, 82, respectively, to pivotally connect the first connector 44 and the second connector 46 to the knuckle 48 for pivoting about the first pivot axis 50 and the second pivot axis 52, respectively.

Referring again to FIG. 4, the pivot axes 50 and 52 are located a predetermined axis distance 108 apart. As will be explained in greater detail herein, the mounting slot length 63 of the mounting slot 62 in the second connector 46 is preferably greater than the axis distance 108 of the knuckle 48 in order for the windshield assembly 10 to function properly.

Referring again to FIGS. 5A–C, 6A–C, and 7, the first connector 44, the second connector 46, and the knuckle 48 each have a longitudinal centerline 120, 122 124, respectively. Each centerline 120, 122, 124 extends radially through the pivot axes and longitudinally through the central portion of each member. The inclined edge 76 of the knuckle 48 is oriented relative to the knuckle centerline 124 at a tapered surface angle 128. As illustrated in FIG. 3, the angle 128 is of sufficient magnitude to enable the second connector centerline 122 and the knuckle centerline 124 to define an acute angle 130 when the upper windshield member 32 is in its folded position over the lower windshield member 34.

During operation, when the windshield assembly 10 is in its use position, the upper and lower pillar supports 36, 38 abut each other to form a rigid windshield support 30, as illustrated in FIG. 2. In this position, both the second connector 46 and the knuckle 48 of the compound hinge 42 are disposed within the hollow rectangular tubing of the lower pillar supports 38, and the first connector 44 is disposed in the hollow section of the upper pillar supports 36. For this to occur, the slot length 63 of mounting slot 62 in the second connector 46 must be such that the slot mounting bolt 94 is allowed to slide freely within the slot 62 for at least a distance slightly greater than the distance 108 between the pivot axes 50, 52. This enables the upper and lower pillar supports 36, 38 to abut each other to enclose the knuckle 48 before the slot mounting bolt 94 contacts the upper end of the slot 62. In this configuration, the upper and lower pillar supports 36, 38 are structurally locked into an erect position to define a single, continuous side windshield support.

Figure 8:
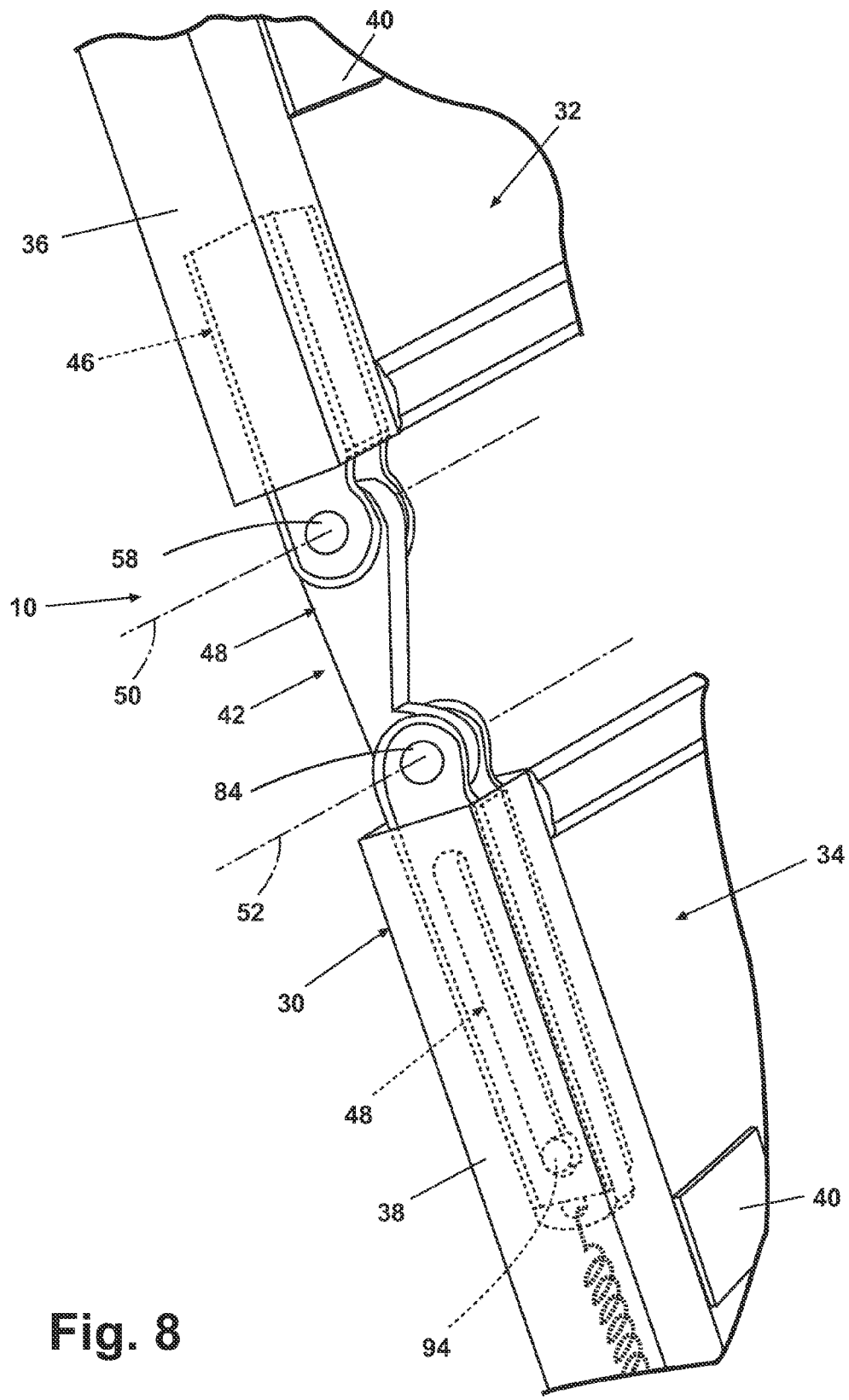
FIG. 8 an enlarged view of a portion of the foldable windshield assembly and compound hinge assembly illustrated in FIG. 1 showing the windshield assembly in an intermediate position with portions of the hinge assembly shown in phantom.

To fold the windshield assembly 10 from its use position to its folded position, the upper windshield member 32 must be unlocked from its use position by being pulled upwards, as illustrated in FIG. 8. The upward movement of the second connector 46 enables relative sliding between the slot mounting bolt 94 and the slot 62 until the slot mounting bolt 94 abuts the lower terminus of the slot 62. In this position, the upper and lower pillar supports 36, 38 are separated to reveal the knuckle 48 as it is extended from within the lower pillar support 38. The compound hinge 42 is then free to pivot at both pivot axes 50, 52, enabling the upper windshield member 32 to fold over the lower windshield member 34, as illustrated in FIG. 3.

The angle 128 of the inclined edge 76 relative to the knuckle centerline 124 is such that the knuckle centerline 124 and the second connector centerline 122 and define an acute angle 130 when the compound hinge 42 is fully folded. This enables the upper windshield member 32 to rest upon and abut the lower windshield member 34 when in the folded position before the compound hinge 42 pivots to its fully folded position.

Though the embodiments herein illustrate the first connector 44 of the compound hinge 42 being rigidly connected to the upper pillar support 36 and the second connector 46 being slidably connected to the lower pillar support 38, one skilled in the art would recognize that other configurations are also possible. For example, the mounting slot 62 and the mounting hole 56 may be disposed in either of the first or second connectors 44, 46. Also, the first connector 44 may be rigidly connected in either of the upper or lower pillar supports 36, 38, and the second connector 46 may be slidably connected to the corresponding opposite pillar support.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A foldable windshield assembly comprising:
   a windshield support including opposing pairs of upper and lower pillar supports;
   an upper windshield member connected to said upper pillar supports;

a lower windshield member connected to said lower pillar supports; and a hinge disposed between said opposing pairs of upper and lower pillar supports, said hinge comprising:

a first connector adapted to be rigidly connected to one of said upper or lower pillar supports;

a second connector adapted to be slidably connected within the other of said upper or lower pillar supports; and a knuckle having ends pivotally connected to said first connector and second connector and adapted to be received within one of said upper or lower pillar supports associated with said second connector;

whereby said upper windshield member is moveable between use and folded positions by separating said upper pillar from said lower pillar to reveal said knuckle from one of said upper or lower supports and folding said upper windshield member over said lower windshield member.

2. The windshield assembly of claim 1 comprising:

first and second pivot axes extending through said knuckle proximate opposing ends of said pivotally connected ends, said first and second axes defining an axis distance therebetween; and a mounting slot disposed in said second connector and sized to slidably receive a slot fastener therethrough to slidably connect one of said upper or lower pillar support to said second connector, said mounting slot defining a mounting slot length that is greater than said axis distance.

3. The windshield assembly of claim 1 comprising:

a mounting slot disposed in said second connector and sized to slidably receive a slot fastener therethrough to slidably connect one of said upper or lower pillar support to said second connector, said mounting slot having first and second opposing slot ends defining a mounting slot length;

whereby said mounting slot length is such that when said slot fastener is proximate said first slot end, said upper and lower pillar supports abut against each other to enclose said knuckle.

4. The windshield assembly of claim 3 wherein said mounting slot length is such that when said slot fastener abuts said second slot end, said knuckle is revealed to enable said upper windshield member to fold over said lower windshield member.

5. The windshield assembly of claim 2 comprising:

said second connector having a second connector centerline extending radially from said second pivot axis and longitudinally through said second connector; and said knuckle having a knuckle centerline extending radially through said first and second pivot axes and an inclined edge proximate said second pivot axis, said inclined edge oriented relative to said knuckle centerline at an angle to enable said second connector centerline and said knuckle centerline to form an acute angle when said upper windshield member is in said folded position.

6. The windshield assembly of claim 2 comprising:

a mounting hole disposed in said first connector and sized to receive a fastener therethrough to rigidly connect said other of said upper or lower pillar support to said first connector.

7. The windshield assembly of claim 1 wherein said first connector and said second connector have a generally symmetrical cross sectional area.

8. The windshield assembly of claim 7 wherein said upper and lower pillar supports comprise hollow square tubes sized to slidably receive said first connector, said second connector, and said knuckle therein.

9. The windshield assembly of claim 1 wherein said windshield assembly is a windshield assembly of a recreational vehicle.

10. The windshield assembly of claim 9 wherein the recreational vehicle is a golf cart.

11. A compound hinge for a foldable windshield assembly, the windshield assembly including a windshield support having opposing pairs of upper and lower pillar supports, an upper windshield member connected to said upper pillar supports, and a lower windshield member connected to said lower pillar supports, the compound hinge comprising:

a first connector adapted to be rigidly connected to one of said upper or lower pillar supports;

a second connector adapted to be slidably connected within the other of said one of said upper or lower pillar supports; and a knuckle having ends pivotally connected to said first connector and second connector and adapted to be received within said one of said upper or lower pillar supports associated with said second connector;

whereby said upper windshield member is moveable between use and folded positions by separating said upper pillar from said lower pillar to reveal said knuckle from said one of said upper or lower supports and folding said upper windshield member over said lower windshield member.

12. The hinge of claim 11 comprising:

first and second pivot axes extending through said knuckle proximate opposing ends of said pivotally connected ends, said first and second axes defining an axis distance therebetween; and a mounting slot disposed in said second connector and sized to slidably receive a slot fastener therethrough to slidably connect one of said upper or lower pillar support to said second connector, said mounting slot defining a mounting slot length that is greater than said axis distance.

13. The hinge of claim 12 comprising:

said second connector having a second connector centerline extending radially from said second pivot axis and longitudinally through said second connector; and said knuckle having a knuckle centerline extending radially through said first and second pivot axes and an inclined edge proximate said second pivot axis, said inclined edge oriented relative to said knuckle centerline at an angle to enable said second connector centerline and said knuckle centerline to define an acute angle when said upper windshield member is in said folded position.

14. The hinge of claim 12 comprising:

a mounting hole disposed in said first connector and sized to receive a fastener therethrough to rigidly connect said other of said upper or lower pillar support to said first connector.

15. The hinge of claim 11 wherein said first connector and said second connector have a generally symmetrical cross sectional area.

* * * * *